United States Patent [19]

Shackleton et al.

[11] Patent Number: 5,719,951
[45] Date of Patent: Feb. 17, 1998

[54] NORMALIZED IMAGE FEATURE PROCESSING

[75] Inventors: Mark Andrew Shackleton; William John Welsh, both of Suffolk, England

[73] Assignee: British Telecommunications public limited company, London, England

[21] Appl. No.: 983,853

[22] PCT Filed: Jul. 17, 1991

[86] PCT No.: PCT/GB91/01183

§ 371 Date: Mar. 4, 1993

§ 102(e) Date: Mar. 4, 1993

[87] PCT Pub. No.: WO92/02000

PCT Pub. Date: Feb. 6, 1992

[30] Foreign Application Priority Data

Jul. 17, 1990 [GB] United Kingdom .................. 9015694
Sep. 11, 1990 [GB] United Kingdom .................. 9019827

[51] Int. Cl.$^6$ ........................................... G06K 9/00
[52] U.S. Cl. ............................................... 382/118; 382/217
[58] Field of Search .................................. 382/1, 2, 16, 30, 382/115, 117, 118, 209, 217, 199

[56] References Cited

U.S. PATENT DOCUMENTS

| | | | |
|---|---|---|---|
| 3,805,238 | 4/1974 | Rothfjell | 340/146 |
| 4,644,584 | 2/1987 | Nagashima et al. | 382/34 |
| 4,841,575 | 6/1989 | Welsh et al. | 381/36 |
| 4,906,940 | 3/1990 | Greene et al. | 382/16 |
| 4,975,969 | 12/1990 | Tal | 382/2 |
| 5,012,522 | 4/1991 | Lambert | 382/2 |

FOREIGN PATENT DOCUMENTS

| | | |
|---|---|---|
| 0225729 | 6/1987 | European Pat. Off. . |
| 0247788 | 12/1987 | European Pat. Off. . |
| 2229305 | 9/1990 | United Kingdom . |
| WOA8707058 | 11/1987 | WIPO . |

OTHER PUBLICATIONS

*IEEE Transactions on Pattern Analysis and Machine Intelligence*, vol. 12, No. 1, Jan. 1990, New York US, pp. 103–108; Kirby et al: "Application of the Karhoenen–Loeve Procedure for the Characterization of Human Faces".

*IEEE Computer Vision and Pattern Recognition*, Jun. 1989, pp. 104–108, Yuille et al: "Feature Extraction From Faces Using Deformable Templates".

*Optical Society of America*, vol. 4, No. 3, Mar. 1987, Sirovich et al: "Low–Dimensional Procedure for the Characterization of Human Faces".

International Search Report.

International Preliminary Examination Report.

Sirovitch et al: "Low Dimensional Procedure for the Characterization of Human Faces," *J. Opt. Soc. Am*, vol. 4, No. 3, pp. 519–524, Mar. 1987.

*IEEE Trans. on Pattern Analysis and Machine Intelligence*, vol. 12, No. 1, pp. 103–108: "Application of the Karhunen–Loeve Procedure for the Characterization of Human Faces", 1990.

*Graphic Languages*—Ed. Rosenfield, "Picure Recognition and Data Structure," Nagoa, M., May 1972.

(List continued on next page.)

Primary Examiner—Yon J. Couso
Attorney, Agent, or Firm—Nixon & Vanderhye P.C.

[57] ABSTRACT

A method of processing an image including the steps of: locating within the image the position of at least one predetermined feature; extracting from the image data representing each feature; and calculating for each feature a feature vector representing the position of the image data of the feature in an N-dimensional space, such space being defined by a plurality of reference vectors each of which is an eigenvector of a training set of like features in which the image data of each feature is modified to normalize the shape of each feature thereby to reduce its deviation from a predetermined standard shape of the feature, which step is carried out before calculating the corresponding feature vector.

11 Claims, 3 Drawing Sheets

OTHER PUBLICATIONS

*Optical Engineering*, vol. 26, No. 7, 1987; Maragos: "Tutorial on Advances in Morphological Image Processing and Analysis".

*International Journal of Computer Vision*, pp. 321–331, 1988; Kass et al: "Snakes: Active Contour Models".

*British Telecom Technology Journal*, vol. 8, No. 3, Jul. 1990, Waite et al: "Head Boundary Location Using Snakes".

*Harvard Robotics Lab. Technical Report No. 88–2*, Yuille et al: "Feature Extraction From Faces Using Deformable Templates", 1989.

Fig. 1.
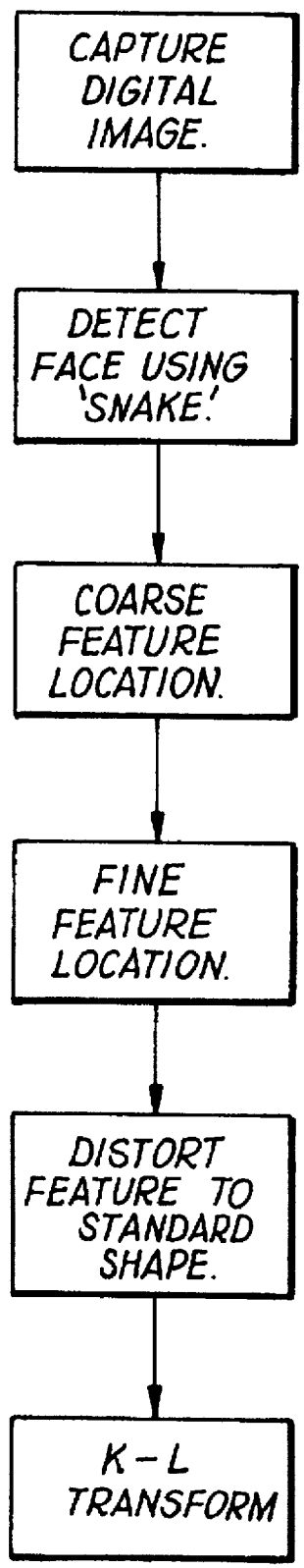
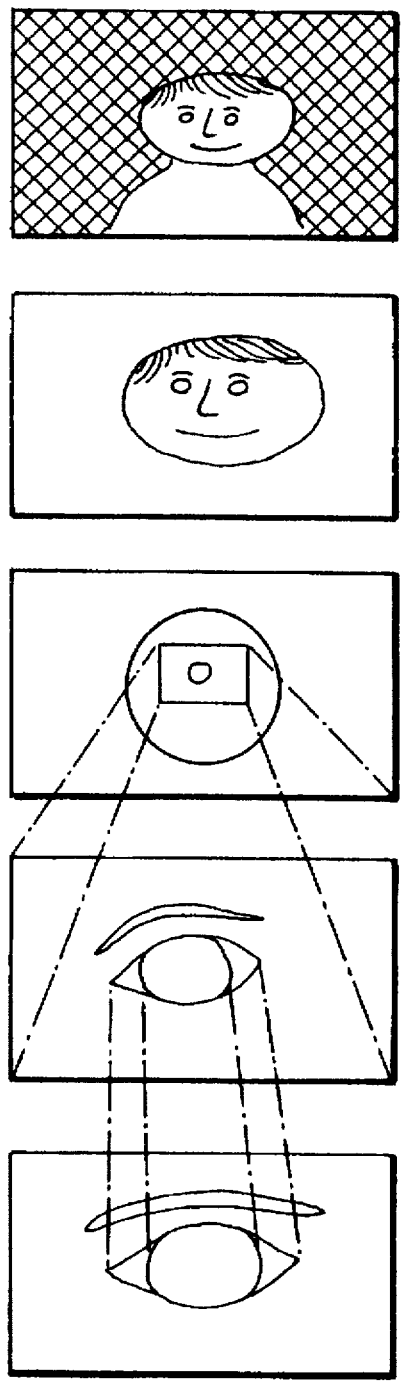

NORMALIZED IMAGE FEATURE PROCESSING

BACKGROUND OF THE INVENTION

1. Field of the Invention

This invention relates to a method of processing an image and particularly, but not exclusively, to the use of such a method in the recognition and encoding of images of objects such as faces.

2. Related Art

One field of object recognition which is potentially useful is in automatic identity verification techniques for restricted access buildings or fund transfer security, for example in the manner discussed in our UK application GB9005190.5. In many such fund transfer transactions a user carries a card which includes machine-readable data stored magnetically, electrically or optically. One particular application of face recognition is to prevent the use of such cards by unauthorised personnel by storing face identifying data of the correct user on the card, reading the data out, obtaining a facial image of the person seeking to use the card by means of a camera, analyzing the image, and comparing the results of the analysis with the data stored on the card for the correct user.

The storage capacity of such cards is typically only a few hundred bytes which is very much smaller than the memory space needed To store a recognisable image as a frame of pixels. It is therefore necessary to use an image processing technique which allows the image to be characterised using the smaller number of memory bytes.

Another application of image processing which reduces the number of bytes needed to characterise an image is in hybrid video coding techniques for video telephones as disclosed in our earlier filed application published as U.S. Pat. No. 4,841,575. In this and similar, applications the perceptually important parts of the image are located and the available coding data is preferentially allocated to those parts.

A known method of such processing of an image comprises the steps of: locating within the image the position of at least one predetermined feature; extracting image data from said image representing each said feature; and calculating each feature a feature vector representing the position of the image data of the feature in an N-dimensional space, said space being defined by a plurality of reference vectors each of which is an eigenvector of a training set of images of like features.

The Karhunen-Loeve transform (KLT) is well known in the signal processing art for various applications. It has been proposed to apply this transform to identification of human faces (Sirovitch and Kirby, J. Opt. Soc. Am. A vol 4 no 3, pp 519–524 "Low Dimensional Procedure for the Characterisation of Human Faces", and IEEE Trans on Pattern Analysis and Machine Intelligence Vol 12, no 1 pp 103–108 "Application of the Karhunen-Loeve Procedure for the Characterisation of Human Faces"). In these techniques, images of substantially the whole face of members of a reference population were processed to derive a set of N eigenvectors each having a picture-like appearance (eigenpictures, or caricatures). These were stored. In a subsequent recognition phase, a given image of a test face (which need not belong to the reference population) was characterised by its image vector in the N-dimensional space defined by the eigenvectors. By comparing the image vector, or data derived therefrom, with the identification data one can generate a verification signal in dependence upon the result of the comparison.

However, despite the ease with which humans "never forget a face", the task for a machine is a formidable one because a person's facial appearance can vary widely in many respects over time because the eyes and mouth, in the case of facial image processing, for example, are mobile.

SUMMARY OF THE INVENTION

According to a first aspect of the present invention a method of processing an image comprises the step of modifying the image data of each feature to normalise the shape of each feature thereby to reduce its deviation from a predetermined standard shape of said feature, which step is carried out before calculating the corresponding feature vector.

We have found that recognition accuracy of images of faces, for example, can be improved greatly by such a modifying step which reduces the effects of a persons's changing facial expression.

In the case of an image of a face, for example, the predetermined feature could be the entire face or a part of it such as the nose or mouth. Several predetermined features may be located and characterised as vectors in the corresponding space of eigenvectors if desired.

It will be clear to those skilled in this field that the present invention is applicable to processing images of objects other than the faces of humans notwithstanding that the primary application envisaged by the applicant is in the field of human face images and that the discussion and specific examples of embodiments of the invention are directed to such images.

The invention also enables the use of fewer eigenpictures, and hence results in a saving of storage or of transmission capacity.

Further, by modifying the shape of the feature towards a standard (topologically equivalent) feature shape, the accuracy with which the feature can be located is improved.

Preferably the training set of images of like features are modified to normalise the shape of each of the training set of images thereby to reduce their deviation from a predetermined standard shape of said feature, which step is carried out before calculating the eigenvectors of the training set of images.

The method is useful not only for object recognition, but also as a hybrid coding technique in which feature position data and feature representative data (the N-dimensional vector) are transmitted to a receiver where an image is assembled by combining the eigen-pictures corresponding to the image vector.

Eigen-pictures provide a means by which the variation in a set of related images can be extracted and used to represent those images and others like them. For instance, an eye image could be economically represented in terms of best coordinate system 'eigen-eyes'.

The eigen-pictures themselves are determined from a training set of representative images, and are formed such that the first eigen-picture embodies the maximum variance between the images, and successive eigen-pictures have monotonically decreasing variance. An image in the set can then be expressed as a series, with the eigen-pictures effectively forming basis functions:

$$I = M + w_1 P_1 + w_2 P_2 + \ldots + w_m P_m$$

where

M=mean over entire training set of images $w_i$=component of the i'th eigen-picture $P_i$=i'th eigen-picture, of m, I=original image If we truncate the above series we still have the best representation we could for the given number of eigen-pictures, in a mean-square-error sense.

The basis of eigen-pictures is chosen such that they point in the directions of maximum variance, subject to being orthogonal. In other words, each training image is considered as a point in n-dimensional space, where 'n' is the size of the training images in pels; eigen-picture vectors are then chosen to lie on lines of maximum variance through the cluster(s) produced.

Given training images $I_1, \ldots, I_m$, we first form the mean image M, and then thee difference images (a. k. a. 'caricatures') $D_i = I_i - M$.

The choosing of the basis of eigen-pictures to point in the directions of maximum variance is equivalent to choosing our eigen-picture vectors $P_k$ such that $$\lambda_k = \left(\frac{1}{m}\right) \sum_j (P_k^T D_j)^2 \text{ is maximised}$$

with $P_i^T P_k = 0, i < k$

The eigen-pictures $P_k$ above are in fact the eigenvectors of a very large covariance matrix, the solution of which would be intractable. However, the problem can be reduced to more manageable proportions by forming the matrix L where $$L_{ij} = D_i^T D_j$$

and solving for the eigenvectors $v_k$ of L.

The eigen-pictures can then be found by $$P_k = \sum_j (v_{kj} D_j)$$

The term 'representation vector' has been used to refer to the vector whose components ($w_i$) are the factors applied to each eigen-picture ($P_i$) in the series. That is $$Q = (w_1, w_2, \ldots, w_m)^T$$

The representation vector equivalent to an image I is formed by taking the inner product of I's caricature with each eigen-picture:

$$w_i = (I-M)^T P_i, \text{ for } 1 \leq +i \leq m.$$

Note that a certain assumption is made when it comes to representing an image taken from outside the training set used to create eigen-pictures; the image is assumed to be sufficiently 'similar' to those in training set to enable it to be well represented by the same eigen-pictures.

The representation of two images can be compared by calculating the Euclidean distance between them:

$$d_{ij} = |Q_i - Q_j|.$$

Thus, recognition can be achieved via a simple threshold, where $d_{ij} < T$ means recognised, or the value of $d_{ij}$ can be used as a sliding confidence scale.

Deformable templates consist of parametrically defined geometric templates which interact with images to provide a best fit of the template to a corresponding image feature. For example, a template for an eye might consist of a circle for the iris and two parabolas for the eye/eyelid boundaries, where size, shape and location parameters are variable.

An energy function is formed by integrating certain image attributes over template boundaries, and parameters are iteratively updated in an attempt to minimise this function. This has the effect of moving the template towards the best available fit in the given image.

The location (within the image) of the position of at least one predetermined feature may be found using a first technique to provide a coarse estimation of position and a second, different, technique to improve upon the coarse estimation. The second technique preferably involves the use of such a deformable template technique.

The deformable template technique requires certain filtered images in addition to the raw image itself, notably peak, valley and edge images. Suitable processed images can be obtained using morphological filters, and it is this stage which is detailed below.

Morphological filters are able to provide a wide range of filtering functions including nonlinear image filtering, noise suppression, edge detection, skeletonization, shape recognition etc. All of these functions are provided via simple combinations of two basic operations termed erosion and dilation. In our case we are only interested in valley, peak and edge detection.

Erosion of greyscale images effectively causes bright areas to shrink in upon themselves, whereas dilation causes bright areas to expand. An erosion followed by a dilation causes bright peaks to be lost (operator called 'open'). Conversely, a dilation followed by an erosion causes dark valleys to be filled (operator called 'close'). For specific details see Maragos P, (1987), "Tutorial on Advances in Morphological Image Processing and Analysis", Optical Engineering. Vol 26. No. 7.

In image processing systems of the kind to which the present invention relates, it is often necessary to locate the object, eg head or face, within the image prior to processing.

Usually this is achieved by edge detection, but traditional edge detection techniques are purely local—an edge is indicated whenever a gradient of image intensity occurs—and hence will not in general form an edge that is completely closed (ie. forms a loop around the head) but will instead create a number of edge segments which together outline or partly outline the head. Post-processing of some kind is thus usually necessary.

We have found that the adaptive contour model, or "snake", technique is particularly effective for this purpose. Preferably, the predetermined feature of the image is located by determining parameters of a closed curve arranged to lie adjacent a plurality of edge features of the image, said curve being constrained to exceed a minimum curvature and to have a minimum length compatible therewith. The boundary of the curve may be initially calculated proximate the edges of the image, and subsequently interactively reduced.

Prior to a detailed description of the physical embodiment of the invention, the 'snake' signal processing techniques mentioned above will now be described in greater detail.

Introduced by Kass et al [Kass m, Witkin A, Terpozopoulus d. "Snakes: Active Contour Models", International Journal of Computer Vision, 321–331, 1988], snakes are a method of attempting to provide some of the post-processing that our own visual system performs. A snake has built into it various properties that are associated with both edges and the human visual system (Eg continuity, smoothness and to some extent the capability to fill in sections of an edge that have been occluded).

A snake is a continuous curve (possibly closed) that attempts to dynamically position itself from a given starting position in such a way that it 'clings' to edges in the image. The form of snake that will be considered here consists of curves that are piecewise polynomial. That is, the curve is in general constructed from N segments $\{x_i(s),y_i(s)\}i=1,\ldots,N$ where each of the $x_i(s)$ and $y_i(s)$ are polynomials in the parameter s. As the parameter s is varied a curve is traced out.

From now on snakes will be referred to as the parametric curve $u(s)=(x(s),y(s))$ where s is assumed to vary between 0 and 1. What properties should an 'edge hugging' snake have?

The snake must be 'driven' by the image. That is, it must be able to detect an edge in the image and align itself with the edge. One way of achieving this is to try to position the snake such that the average 'edge strength', (however that may be measured) along the length of the snake is maximised. If the measure of edge strength is $F(x,y) \geq 0$ at the image point (x,y) then this amounts to saying that the snake u(s) is to be chosen in such a way that the function $$\int_{s=0}^{1} F(x(s),y(s)) ds \tag{1}$$

is maximised. This will ensure that the snake will tend to mould itself to edges in the image if it finds them, but does not guarantee that it will find them in the first place. Given an image, the function (1) may have many local minima-when viewed as a static problem. Finding them is where the 'dynamics' arise.

An edge detector applied to an image will tend to produce an edge map consisting of mainly thin edges. This means that the edge strength function tends to be zero at most places in the image, apart from on a few lines. As a consequence a snake placed some distance from an edge may not be attracted Towards the edge because the edge strength is effectively zero at the snakes initial position. To help the snake come under the influence of an edge, the edge image is blurred to broaden the width of the edges.

If an elastic band were held around a convex object and then let go, the band would contract until the object prevented it from doing so further. At this point the band would be moulded to the object, thus describing the boundary. Two forces are at work here. Firstly that of providing the natural tendency of the band to contract; secondly that of providing the opposing force provided by the object. The band contracts because it tries to minimise its elastic energy due to stretching. If the band were described by the parametric curve $u(s)=(x(s),y(s))$ then the elastic energy at any point s is proportional to $$\left( \frac{du}{ds} \bigg|_s \right)^2 = \left( \frac{dx}{ds} \bigg|_s \right)^2 + \left( \frac{dy}{ds} \bigg|_s \right)^2$$

That is, the energy is proportional to the square of how much the curve is being stretched at that point. The elastic energy along its entire length, given the constraint of the object, is minimised. Hence the elastic band assumes the shape of the curve $u(s)=(x(s),y(s))$ where the u(s) minimises the function $$\int_{s=0}^{1} \left\{ \left( \frac{dx}{ds} \right)^2 + \left( \frac{dy}{ds} \right)^2 \right\} ds \tag{2}$$

subject to the constraints of the object. We would like closed snakes to have analogous behaviour. That is, to have a tendency to contract, but to be prevented from doing so by the objects in an image. To model this behaviour the parametric curve for the snake is chosen so that the function (2) tends to be minimised. If in addition the forcing term of function (1) were included then the snake would be prevented from contracting 'through objects' as it would be attracted toward their edges. The attractive force would also tend to pull the snake into the hollows of a concave boundary, provided that the restoring 'elastic force' was not too great.

One of the properties of the edges that is difficult to model is their behaviour when they can no longer be seen. If one were looking at a car and a person stood in front of it, few would have any difficulty imagining the contours of the edge of the car that were occluded. They would be 'smooth' extensions of the contours either side of the person. If the above elastic band approach were adopted it would be found that the band formed a straight line where the car was occluded (because it tries to minimise energy, and thus length in this situation). If however the band had some stiffness (that is a resistance to bending, as for example displayed by a flexible bar) then it would tend to form a smooth curve in the occluded region of the image and be tangential to the boundaries on either side.

Again a flexible bar tends to form a shape so that its elastic energy is minimised. The elastic energy in bending is dependent on the curvature of the bar, that is the second derivatives. To help force the snake to emulate this type of behaviour the parametric curve $u(s)=(x(s),y(s))$ is chosen so it tends to minimise the function $$\int_{s=0}^{1} \left\{ \left( \frac{d^2x}{ds^2} \right)^2 + \left( \frac{d^2y}{ds^2} \right)^2 \right\} ds \tag{3}$$

which represents a pseudo-bending energy term. Of course, if a snake were made too stiff it would be difficult to force it to conform to highly curved boundaries under the action of the forcing term of function (1).

Three desirable properties of snakes have now been identified. To incorporate all three into the snake at once, the parametric curve $u(s)=(x(s),y(s))$ representing the snake is chosen so that it minimises the function $$I(x(s),y(s)) = \tag{4}$$

$$\int_{s=0}^{1} \left\{ \alpha(s) \left[ \left( \frac{d^2x}{ds^2} \right)^2 + \left( \frac{d^2y}{ds^2} \right)^2 \right] + \beta(s) \left[ \left( \frac{dx}{ds} \right)^2 + \left( \frac{dy}{ds} \right)^2 \right] - F(x(s),y(s)) \right\} ds$$

Here the terms $\alpha(s)>0$ and $\beta(s) \geq 0$ represent respectively the amount of stiffness and elasticity that the snake is to have. It is clear that if the snake approach is to be successful then the correct balance of these parameters is crucial. Too much stiffness and the snake will not correctly hug the boundaries; too much elasticity and closed snakes will be pulled across boundaries and contract to a point or may even break away from boundaries at concave regions. The negative sign in front of the forcing term is because minimising $-\int F(x,y) ds$ is equivalent to maximising $\int F(x,y) s$.

As it stands, minimising the function (4) is trivial. If the snake is not closed then the solution degenerates into a single point (x(s),y(s))=constant, where the point is chosen to minimise the edge strength F(x(s),y(s)). Physically, this is because the snake will tend to pull its two end points together in order to minimise the elastic energy, and thus shrink to a single point. The global minimum is attained at the point in the image where the edge strength is largest. prevent this from occurring it is necessary to fix the positions of the ends of the snake in some way. That 'boundary conditions' are required. It turns out to be necessary to fix more than just the location of the end points and two further conditions are required for a well posed problem. A convenient condition is to impose zero curvature at each end point.

Similarly, the global minimum for a closed-loop snake occurs when it contracts to a single point. However, in contrast to an fixed-end snake, additional boundary conditions cannot be applied to eliminate the degenerate solution. The degenerate solution in this case is the true global minimum.

Clearly the ideal situation is to seek a local minimum in the locality of the initial position of the snake. In practice the problem that is solved is weaker than this: find a curve $\hat{u}(s)=(\hat{x}(s),\hat{y}(s)) \in H^2[0,1] \times H^2[0,1]$ such that $$\frac{\partial I(\hat{u}(s) + \epsilon \underline{v}(s))}{\partial \epsilon}\bigg|_{\epsilon=0} = 0; \underline{v}(s) \in H_0^2[0,1] \times H_0^2[0,1] \quad (5)$$

Here $H^2[0,1]$ denotes the class of real valued functions defined on $[0,1]$ that have 'finite energy' in the second derivatives (that is the integral of the square of the second derivatives exists [Keller HB. Numerical Methods for Two-Point Boundary Value Problems, Blaisdell, 1968] and $H_0^2[0,1]$ is the class of functions in $H^2[0,1]$ that are zero at $s=0$ and $s=1$. To see how this relates to finding a minimum consider $\hat{u}(s)$ to be a local minimum and $\hat{u}(s)+\epsilon v(s)$ to be a perturbation about the minimum that satisfies the same boundary conditions (ie $v(0)=v(1)=0$).

Clearly, considered as a function of $\epsilon$, $I(\epsilon)=I\hat{u}(s)+\epsilon v(s))$ is a minimum at $\epsilon=0$. Hence the derivative of $I(\epsilon)$ must be zero at $\epsilon=0$. Equation (5) is therefore a necessary condition for a local minimum. Although solutions to (5) are not guaranteed to be minima for completely general edge strength functions, it has been found in practice that solutions are indeed minima.

Standard arguments in the calculus of variations show that problem (5) is equivalent to another problem, which is simpler to solve: find a curve $(\hat{x}(s),\hat{y}(s)) \in C^4[0,1] \times C^4[0,1]$ that satisfies the pair of fourth order ordinary differential equations $$-\frac{d^2}{ds^2}\left\{\alpha(s)\frac{d^2\hat{x}}{ds^2}\right\} + \frac{d}{ds}\left\{\beta(s)\frac{d\hat{x}}{ds}\right\} + \frac{1}{2}\frac{\partial F}{\partial x}\bigg|_{(\hat{x},\hat{y})} = 0 \quad (6)$$

$$-\frac{d^2}{ds^2}\left\{\alpha(s)\frac{d^2\hat{y}}{ds^2}\right\} + \frac{d}{ds}\left\{\beta(s)\frac{d\hat{y}}{ds}\right\} + \frac{1}{2}\frac{\partial F}{\partial y}\bigg|_{(\hat{x},\hat{y})} = 0 \quad (7)$$

together with the boundary conditions $\hat{x}(0),\hat{y}(0),\hat{x}(1),\hat{y}(1)$ given, and $$\frac{d^2\hat{x}}{ds^2}\bigg|_{s=0} = \frac{d^2\hat{y}}{ds^2}\bigg|_{s=0} = \frac{d^2\hat{x}}{ds^2}\bigg|_{s=1} = \frac{d^2\hat{y}}{ds^2}\bigg|_{s=1} = 0 \quad (7)$$

The statement of the problem is for the case of a fixed-end snake, but if the snake is to form a closed loop then the boundary conditions above are replaced by periodicity conditions. Both of these problems can easily be solved using finite differences.

The finite difference approach starts by discretising the interval $[0,1]$ into $N-1$ equispaced subintervals of length $h=1/(N-1)$ and defines a set of nodes $\{(s_i)\}_{i=1}^{N}$ where $s_i = (i-1)h$.

The method seeks a set of approximations $\{(x_i,y_i)\}_{i=1}^{N}$ to $\{(x(s_i),y(s_i))\}_{i=1}^{N}$ by replacing the differential equations (6) and (7) in the continuous variables with a set of difference equations in the discrete variables [Keller HB., ibid.]. Replacing the derivatives in (6) by difference approximations at the point $s_i$ gives $$-\frac{1}{h^2}\left\{\alpha_{i-1}\frac{(x_{i+2}-2x_{i+1}+x_i)}{h^2} - \right. \quad (9)$$

$$2\alpha_i\frac{(x_{i+1}-2x_i+x_{i-1})}{h^2} + \alpha_{i-1}\frac{(x_i-2x_{i-1}+x_{i-2})}{h^2}\right\} +$$

$$\frac{1}{h}\left\{\beta_{i+1}\frac{(x_{i+1}-x_i)}{h} - \beta_i\frac{(x_i-x_{i-1})}{h}\right\} +$$

$$\frac{1}{2}\frac{\partial F}{\partial x}\bigg|_{(x_i,y_i)} = 0; \text{ for } i=3,4,\ldots,N-2$$

where $\alpha_i=\alpha(s_i)$ and $\beta_i=\beta(s_i)$. Similarly a difference approximation to (7) may be derived. Note that the difference equation only holds at internal modes in the interval where the indices referenced lie in the range I to N. Collecting like terms together, (9) can be written as $$a_i x_{i-2} + b_i x_{i-1} + c_i x_i + d_i x_{i+1} + e_i x_{i+2} = f_i$$

where $$a_i = \frac{\alpha_{i-1}}{h^4}$$

$$b_i = \frac{2\alpha_i}{h^4} + \frac{2\alpha_{i-1}}{h^4} + \frac{\beta_i}{h^2}$$

$$c_i = -\left\{\frac{\alpha_{i+1}}{h^4} + \frac{4\alpha_i}{h^4} + \frac{\alpha_{i-1}}{h^4} - \frac{\beta_{i-1}}{h^2} + \frac{\beta_i}{h^2}\right\}$$

$$d_i = \frac{2\alpha_{i+1}}{h^4} - \frac{2\alpha_i}{h^4} + \frac{\beta_{i+1}}{h^2}$$

$$e_i = -\frac{\alpha_{i+1}}{h^4}$$

$$f_i = -\frac{1}{2}\frac{\partial F}{\partial x}\bigg|_{(x_i,y_i)}$$

Discretising both the differential equations (6) and (7) and taking boundary conditions into account, the finite difference approximations $\underline{x}=\{x_i\}$ and $\underline{y}=\{y_i\}$ to $\{x_i\}$ and $\{y_i\}$, respectively, satisfy the following system of the algebraic equations $K\underline{x}=f(\underline{x},\underline{y}), K\underline{y}=g(\underline{x},\underline{y})$ The structure of the matrices K and the right hand vectors $\underline{f}$ and $\underline{g}$ are different depending on whether closed or open snake boundary conditions are used. If the snake is closed then fictitious nodes at $S_0, S_{-1}, S_{N+1}$ and $S_{N+2}$ introduced and the difference equation (9) is applied at nodes $0, 1, N-1$ and $N$.

Periodicity implies that $x_0=x_N$, $x_{-1}=x_{N-1}$, $x_{N+1}=x_1$ and $x_2=x_{N+2}$. With these conditions in force the coefficient matrix becomes $$K = \begin{pmatrix} c_1 & d_1 & e_1 & & & & a_i & b_i \\ b_2 & c_2 & d_2 & e_2 & & & & a_2 \\ a_3 & b_3 & c_3 & d_3 & e_3 & & & \\ & a_4 & b_4 & c_4 & d_4 & e_4 & & \\ & & \cdot & \cdot & \cdot & \cdot & \cdot & \\ & & & \cdot & \cdot & \cdot & \cdot & \cdot \\ e_{N-1} & & & & a_{N-1} & b_{N-1} & c_{N-1} & d_{N-1} \\ d_N & e_N & & & & a_N & b_N & c_N \end{pmatrix}$$

and the right hand side vector is $(f_1, f_2, \ldots, f_N)^T$

For fixed-end snakes fictitious nodes at $S_o$ and $S_{N+1}$ are introduced and the difference equation (9) is applied at nodes $S_1$ and $S_{N+1}$. Two extra difference equations are introduced to approximate the zero curvature boundary conditions:

$$\left.\frac{d^2x}{ds^2}\right|_{s_1} = \left.\frac{d^2x}{ds^2}\right|_{s_N} = 0$$

namely $x_0 - 2x_1 + x_2 = 0$ and $x_{-1} - 2x_N + x_{N+1} = 0$. The coefficient matrix is now $$K = \begin{pmatrix} (c_2 - a_2) & d_2 & e_2 & & & & & \\ b_3 & c_3 & d_3 & e_3 & & & & \\ a_4 & b_4 & c_4 & d_4 & e_4 & & & \\ & a_5 & b_5 & c_5 & d_5 & e_5 & & \\ & & \cdot & \cdot & \cdot & \cdot & \cdot & \\ & & & \cdot & \cdot & \cdot & \cdot & \\ & & & & a_{N-2} & b_{N-2} & c_{N-2} & d_{N-2} \\ & & & & & a_{N-1} & b_{N-1} & (c_{N-1} - e_{N-1}) \end{pmatrix}$$

and the right hand side vector is $(f_2 - (2a_2 + b_2)x_1, f_3 - a_3 x_1, \ldots, f_{N-3}, f_{N-2} e_{N-2} x_N, f_{N-1} - (2e_{N-1} + d_{N-1})x_N)^T$ The right hand side vector for the difference equations corresponding to (7) is derived in a similar fashion.

The system of functions (10) represents a set of non-linear equations that has to be solved. The coefficient matrix is symmetric and positive definite, and banded for the fixed-end snake. For a closed-loop snake with periodic boundary conditions it is banded, apart from a few off-diagonal entries. As the system is non-linear it is solved iteratively. The iteration performed is $$\frac{(x_{n+1} - x_n)}{\gamma} + Kx_{n+1} = f(x_n, y_n) \text{ for } n = 0,1,2,\ldots$$

$$\frac{(y_{n+1} - y_n)}{\gamma} + Ky_{n+1} = g(x_n, y_n) \text{ for } n = 0,1,2,\ldots$$

where $\gamma > 0$ is a stabilisation parameter. This can be rewritten as $$\left(K + \frac{1}{\gamma} I\right) x_{n+1} = \frac{1}{\gamma} x_n + f(x_n, y_n) \text{ for } n = 0,1,2,\ldots$$

-continued $$\left(K + \frac{1}{\gamma} I\right) y_{n+1} = \frac{1}{\gamma} y_n + g(x_n, y_n) \text{ for } n = 0,1,2,\ldots$$

This system has to be solved for each n. For a closed-loop snake the matrix on the left hand side is difficult to invert directly because the terms that are outside the main diagonal band destroy the band structure. In general, the coefficient matrix K can be split into the sum of a banded matrix B plus a non-banded matrix A; K=A+B. For a fixed-end snake the matrix A would be zero. The system of equations is now solved for each n by performing the iteration $$\left(B + \frac{1}{\gamma} I\right) x_{n+1}^{(k+1)} = -A x_{n+1}^{(k)} + \frac{1}{\gamma} x_n + f(x_n, y_n) \text{ for } k = 0,1,2,\ldots$$

$$\left(B + \frac{1}{\gamma} I\right) y_{n+1}^{(k+1)} = -A y_{n+1}^{(k)} + \frac{1}{\gamma} y_n + g(x_n, y_n) \text{ for } k = 0,1,2,\ldots$$

The matrix $(B + I/\gamma)$ is a band matrix and can be expressed as a product of Cholesky factors $LL^T$ [Johnson Reiss, ibid.]. The systems are solved at each stage by first solving $$L \bar{x}_{n+1}^{(k+1)} = -A x_{n+1}^{(k)} + \frac{1}{\gamma} x_n + f(x_n, y_n)$$

$$L \bar{y}_{n+1}^{(k+1)} = -A y_{n+1}^{(k)} + \frac{1}{\gamma} y_n + g(x_n, y_n)$$

followed by $$L^T x_{n+1}^{(k+1)} = \bar{x}_{n+1}^{(k+1)}$$

$$L^T y_{n+1}^{(k+1)} = \bar{y}_{n+1}^{(k+1)}$$

Notice that the Cholesky decomposition only has to be performed once.

Model-based coding schemes use 2-D or 3-D models of scene objects in order to reduce the redundancy in the information need&d to encode a moving sequence of images. The location and tracking of moving objects is of fundamental importance to this. Videoconference and videophone type scenes may present difficulties for conventional machine vision algorithms as there can often be low contrast and 'fuzzy' moving boundaries between a person's hair and the background. Adaptive contour models or 'snakes' form a class of techniques which are able to locate and track object boundaries; they can fit themselves to low contrast boundaries and can fill in across boundary segments between which there is little or no local evidence for an edge. This paper discusses the use of snakes for isolating the head boundary in images as well as a technique which combines block motion estimation and the snake: the 'power-assisted' snake.

The snake is a continuous curve (possibly closed) which attempts to dynamically position itself from a given starting position in such a way that it clings to edges in the image. Full details of the implementation for both closed and 'fixed-end' snakes are given in Waite J B, Welsh W J, "Head Boundary Location using Snakes", British Telecom Technology Journal, Vol 8, No 3, July 1990, which describes two alternative implementation strategies: finite elements and finite differences. We implemented both closed and fixed-end snakes using finite differences. The snake is initialised around the periphery of a head-and-shoulders image and allowed contract under its own internal elastic force. It is also acted on by forces derived from the image which are generated by first processing the image using a Laplacian-type operator with a large space constant the output of which is rectified and modified using a smooth non-linear function. The rectification results in isolating the 'valley' features which have been shown to correspond to the subjectively important boundaries in facial images; the non-linear function effectively reduces the weighting of strong edges relative to weaker edges in order to give the weaker boundaries a better chance to influence the snake. After about 200 iterations of the snake it reaches the position hugging the boundary of the head. In a second example, a fixed-end snake with its end points at the bottom corners of the image was allowed to contract in from the sides and top of the image. The snake stabilises on the boundary between hair and background although this is a relatively low-contrast boundary in the image. As the snake would face problems trying to contract across a patterned background, it might be better to derive the image forces from a moving edge detector.

In Kass et al, ibid., an example is shown of snakes being used to track the moving lips of a person. First, the snake is stabilised on the lips in the first frame of a moving sequence of images; in the second frame it is initialised in the position corresponding to its stable position in the previous frame and allowed to achieve equilibrium again. There is a clear problem with the technique in this form in that if the motion is too great between frames, the snake may lock on to different features in the next frame and thus lose track. Kass suggests a remedy using the principle of 'scale-space continuation': the snake is allowed to stabilise first on an image which has been smoothed using a Gaussian filter with a large space constant; this has the effect of pulling the snake in from a large distance. After equilibrium has occurred, the snake is presented with a new set of image forces derived by using a Gaussian with slightly smaller space constant and the process is continued until equilibrium has occurred in the image at the highest level of resolution possible.

This is clearly a computationally expensive process; a radically simpler technique has been developed and found to work well and this will now be described. After the snake has reached equilibrium in the first frame of a sequence, block motion estimation is carried out at the positions of the snake nodes (the snake is conventionally implemented by approximating it with a set of discrete nodes—24 in our implementation). The motion estimation is performed from one frame into the next frame which is the opposite sense to that conventionally performed during motion compensation for video coding. If the best match positions for the blocks are plotted in the next frame then, due to the 'aperture problem', a good match can often be found at a range of points along a boundary segment which is longer than the side of the block being matched. The effect is to produce a non-uniform spacing of the points. The snake is then initialised in the frame with its nodes at the positions of the best match block positions and allowed to run for a few iterations, typically ten. The result is the nodes are now uniformly distributed along the boundary; the snake has successfully tracked the boundary, the block motion estimation having acted as a sort of 'power-assist' which will ensure tracking is maintained as long as the overall motion is not greater than the maximum displacement of the block search. As the motion estimation is performed at only a small set of points, the computation time is not increased significantly.

Both fixed-end and closed snakes have been shown to perform object boundary location even in situations where there may be a low contrast between the object and its background.

A composite technique using both block motion estimation and snake fitting has been shown to perform boundary tracking in a sequence of moving images. The technique is simpler to implement than an equivalent coarse-to-fine resolution technique. The methods described in the paper have so far been tested in images where the object boundaries do not have very great or discontinuous curvature at any point; if these conditions are not met, the snake Would fail to conform itself correctly to the boundary contour. One solution, currently being pursued, is effectively split the boundaries into a number of shorter segments and fit these segments with several fixed-end snakes.

According to a second aspect of the present invention a method of verifying the identity of the user of a data carrier comprises: generating a digital facial image of the user; receiving the data carrier and reading therefrom identification data; performing the method of the first aspect of the present invention; comparing each feature vector, or data derived therefrom, with the identification data; and generating a verification signal in dependence upon the comparison.

According to a yet further aspect of the present invention apparatus for verifying the identity of the user of a data carrier comprises: means for generating a digital facial image of the user; means for receiving the data carrier and reading therefrom identification data; means for performing the method of the first aspect of the present invention; and means for comparing each feature vector, or data derived therefrom, with the identification data and generating a verification signal in dependence upon the comparison.

BRIEF DESCRIPTION OF THE DRAWINGS

An embodiment of the invention will now be described, by way of example only, with reference to the accompanying drawings in which:

FIG. 1 is flow diagram of the calculation of a feature vector;

DETAILED DESCRIPTION OF THE INVENTION

Referring to FIG. 1, an overview of an embodiment incorporating both aspects of the invention will be described.

An image of the human face is captured in some manner—for example by using a video camera or by a photograph—and digitised to provide an array of pixel values. A head detection algorithm is employed to locate the position within the array of the face or head. This head location stage may comprise one of several known methods but is preferably a method using the above described "snake" techniques. Pixel data lying outside the boundaries thus determined are ignored.

The second step is carried out on the pixel data lying inside the boundaries to locate the features to be used for recognition—typically the eyes and mouth. Again, several location techniques for finding the position of the eyes and mouth are known from the prior art, but preferably a two stage process of coarse location followed by fine location is employed. The coarse location technique might, for example, be that described in U.S. Pat. No. 4,841,575.

The fine location technique preferably uses the deformable template technique described by Yuille et al "Feature Extraction from Faces using Deformable Templates", Harvard Robotics Lab Technical Report Number; 88/2 published in Computer Vision and Pattern Recognition, June 1989 IEEE. In this technique which has been described above, a line model topologically equivalent to the feature is positioned (by the coarse location technique) near the feature and is iteratively moved and deformed until the best fit is obtained. The feature is identified as being at this position.

Next, the shape of the feature is changed until it assumes a standard, topologically equivalent, shape. If the fine location technique utilised deformable templates as disclosed above, then the deformation of the feature can be achieved to some extent by reversing the deformation of the template to match the feature to the initial, standard, shape of the template.

Since the exact position of the feature is now known, and its exact shape is specified, this information can be employed to identify the image and as a supplement to the recognition process using the feature vector of the feature. All image data outside the region identified as being the feature are ignored and the image data identified as being the feature are resolved into its orthogonal eigen-picture components corresponding to that feature. The component vector is then compared with a component vector corresponding to a given person to be identified and, in the event of substantial similarity, recognition may be indicated.

Figure 2:
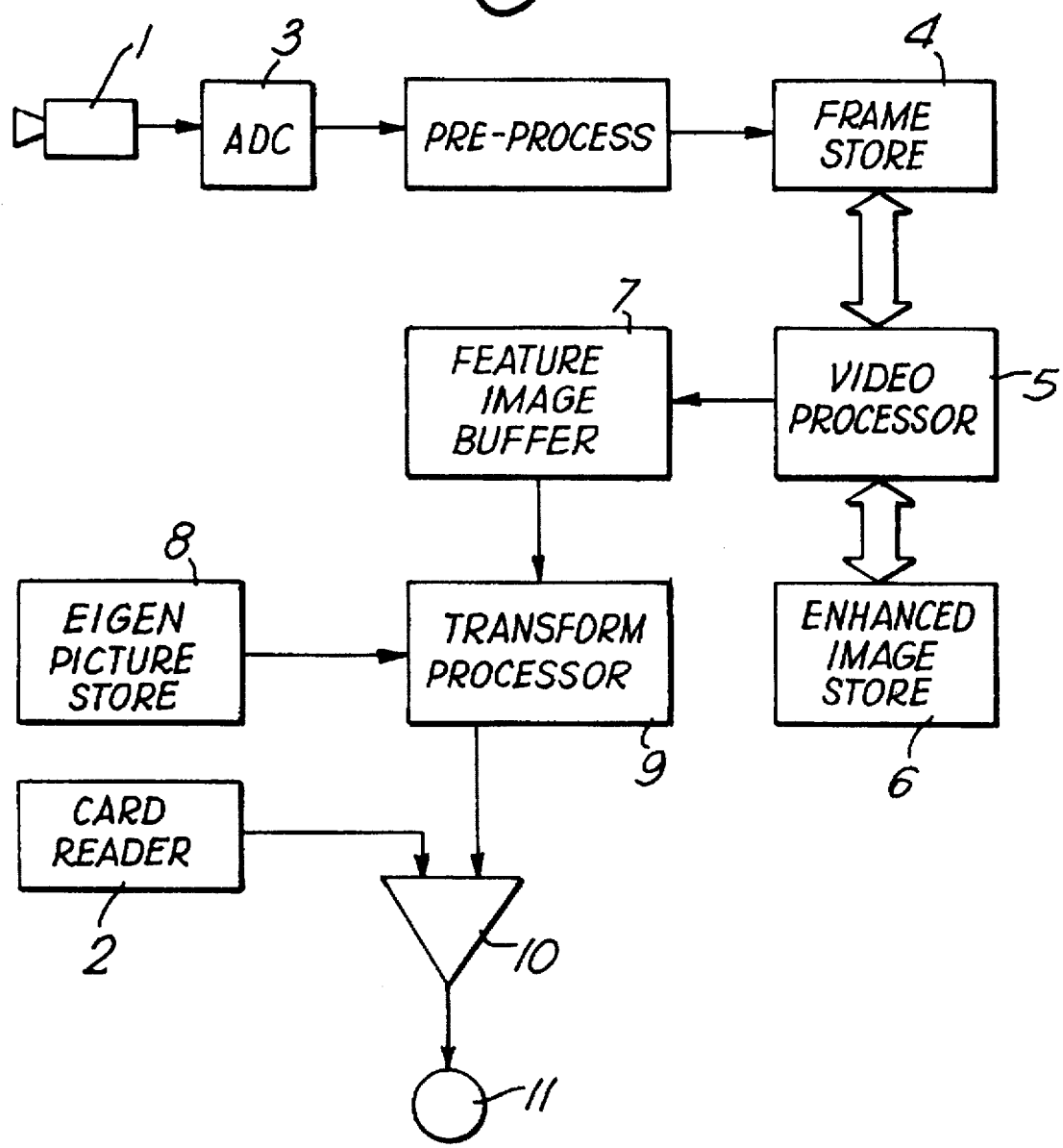
FIG. 2 illustrates apparatus for credit verification using the method of the present invention.

Referring to FIG. 2, an embodiment of the invention suitable for credit card verification will now be described.

A video camera 1 receives an image of a prospective user of a credit card terminal. Upon entry of the card to a card entry device 2, the analogue output of the video camera 1 is digitised by an AD converter 3, and sequentially clocked into a framestore 4. A video processor 5 (for example, a suitable processed digital signal processing chip such as that AT&T DSP 20) is connected to access the framestore 4 and processes the digital image therein to form and edge-enhanced image. One method of doing this is simply to subtract each sample from its predecessor to form a difference picture, but a better method involves the use of a Laplacian type of operator, the output of which is modified by a sigmoidal function which suppresses small levels of activity due to noise as well as very strong edges whilst leaving intermediate values barely changed. By this means, a smoother edge image is generated, and weak edge contours such as those around the line of the chin are enhanced. This edge picture is stored in an edge picture frame buffer 6. The processor then executes a closed loop snake method, using finite differences, to derive a boundary which encompasses the head. Once the snake algorithm has converged, the position of the boundaries of the head in the edge image and hence the corresponding image in the frame store 4 is now in force.

The edge image in the framestore 6 is then processed to derive a coarse approximation to the location of the features of interest—typically the eyes and the mouth. The method of Nagao is one suitable technique (Nagoa M, "Picture Recognition and Data Structure", Graphic Languages—Ed. Rosenfield) as described in our earlier application EP0225729. The estimates of position thus derived are used as starting positions for the dynamic template process which establishes the exact feature position.

Figure 3:
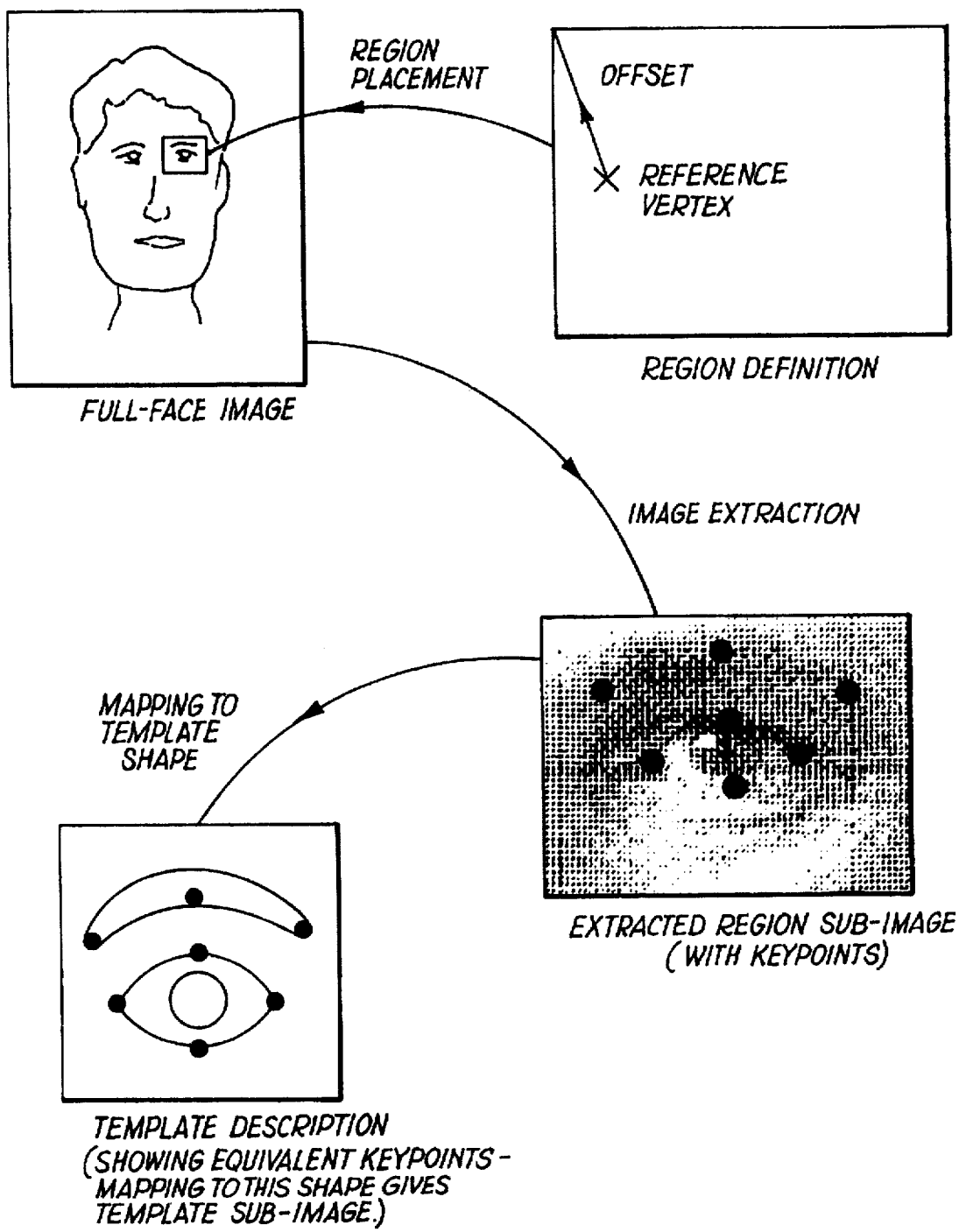
FIG. 3 illustrates the method of the present invention.

Accordingly, processor 5 employs the method described in Yuille et al [Yuille A, Cohen D, Hallinan P, (1988), "Facial Feature Extraction by Deformable Templates", Harvard Robotics Lab. Technical Report no. 88-2] to derive position data for each feature which consists of a size (or resolution) and a series of point coordinates given as fractions of the total size of the template. Certain of these points are designated as keypoints which are always internal to the template,  the other points always being edge points. These key point position data are stored, and may also be used as recognition indicia. This is indicated in FIG. 3.

Next, the geometrical transformation of the feature to the standard shape is performed by the processor 5. This transformation takes the form of a mapping between triangular facets of the regions and the templates. The facets consist of local collections of three points and are defined in the template definition files. The mapping is formed by considering the x, y values of template vertices with each of the x',y' values of the corresponding region vertices—this yields two plane equations from which each x',y' point can be calculated given any x,y within the template facet, and thus the image data can be mapped from the region sub-image.

The entire template sub-image is obtained by rendering (or scan-converting) each constituent facet pel by pel, taking the pel's value from the corresponding mapped location in the equivalent region's sub-image.

The processor 5 is arranged to perform the mapping of the extracted region sub-images to their corresponding generic template size and shape. The keypoints on the regions form a triangular mesh with a corresponding mesh defined for the generic template shape; mappings are then formed from each triangle in the generic mesh to its equivalent in the region mesh. The distorted sub-images are then created and stored in the template data structures for later display.

The central procedure in this module is the 'template stretching' procedure. This routine creates each distorted template sub-image facet by facet (each facet is defined by three connected template points). A mapping is obtained from each template facet to the corresponding region facet and then the template face is filled in pel by pet with image data mapped from the region sub-image. After all facets have been processed in this way the distorted template sub-image will have been completely filled in with image data.

The standardised feature image thus produced is then stored in a feature image buffer 7. An eigen-picture buffer 8 contains a plurality (for example 50) of eigen-pictures of increasing sequency which have previously been derived in known manner from a representative population (preferably using an equivalent geometric normalisation technique to that disclosed above). A transform processor 9 (which may in practice be realised as processor 5 acting under suitable stored instructions ) derives the co-ordinates or components of the feature image with regard to each eigen-picture, to give a vector of 50 numbers, using the method described above. The card entry device 2 reads from the inserted credit card the 50 components which characterise the correct user of that card, Which are input to a comparator 10 (which may again in practice be realised as part of a single processing device) which measures the distance in pattern space between the two connectors. The preferred metric is the Euclidian distance, although other distance metrics (eg. "a city block" metric) could equally be used. If this distance is less than a predetermined threshold, correct recognition is indicated to an output 11; otherwise, recognition failure is signalled.

Other data may also be incorporated into the recognition process; for example, data derived during template deformation, or head measurements (e.g. the ratio of head height to head width derived during the head location stage) or the feature position data as mentioned above. Recognition results may be combined in the manner indicated in our earlier application GB9005190.5.

Generally, some preprocessing of the image is provided (indicated schematically as 12 in FIG. 2); for example, noise filtering (spatial or temporal) and brightness or contrast normalisation.

Variations in lighting can produce a spatially variant effect on the image brightness due to shadowing by the brows etc. It may be desirable to further pre-process the images to remove most of this variation by using a second derivative operator or morphological filter in place of the raw image data currently used. A blurring filter would probably also be required.

It might also be desirable to reduce the effects of variations in geometric normalisation on the representation vectors. This could be accomplished by using low-pass filtered images throughout which should give more stable representations for recognition purposes.

We claim:

1. A method of processing an image represented by an array of digital signals, said method comprising the steps off
   locating within the image array of digital signals the position of at least one predetermined feature;
   extracting image data from said image array of digital signals representing each said feature;
   generating for each feature a feature vector digital signal representing the position of the image data of the feature in an N-dimensional space, N being an integer and said space being defined by a plurality of reference vector signals each of which is an eigenvector of a training set of images of like features; and
   modifying the digital signal image data of each feature to normalize the shape of each feature thereby to reduce its deviation from a predetermined standard shape of said feature, which step is carried out before generating the feature vector signal for each feature.

2. A method of processing an image represented by an array of digital signals, said method comprising the steps of:
   locating within the image array of digital signals the position of at least one predetermined feature;
   extracting image data from said image array of digital signals representing each said feature;
   generating for each feature a feature vector digital signal representing the position of the image data of the feature in an N-dimensional space, N being an integer and said space being defined by a plurality of reference vector signals each of which is an eigenvector of a training set of images of like features; and
   modifying the digital signal image data of each feature to normalize the shape of each feature thereby to reduce its deviation from a predetermined standard shape of said feature, which step is carried out before generating the feature vector signal for each feature,
   wherein the step of modifying the digital signal image data of each feature uses a deformable template.

3. A method of processing an image represented by an array of digital signals, said method comprising the steps of:
   locating within the image array of digital signals the position of at least one predetermined feature;
   extracting image data from said image array of digital signals representing each said feature;
   generating for each feature a feature vector digital signal representing the position of the image data of the feature in an N-dimensional space, N being an integer and said space being defined by a plurality of reference vector signals each of which is an eigenvector of a training set of images of like features; and
   modifying the digital signal image data of each feature to normalize the shape of each feature thereby to reduce its deviation from a predetermined standard shape of said feature, which step is carried out before generating the feature vector signal for each feature,
   wherein the step of locating within the digital signal image the position of at least one predetermined feature employs:
   a first technique to provide a coarse estimation of position, and
   a second, different, technique to improve upon the coarse estimation.

4. A method according to claim 3 wherein the second technique uses a deformable template.

5. A method according to claim 1 in which the training set of digital signal images of like features are modified to normalize the shape of each of the training set of digital signal images to reduce deviation from a predetermined standard shape of features and subsequently the reference vector eigenvectors of the training set of digital signal images are generated.

6. A method according to claim 1 wherein said locating step comprises:
   locating a portion of the digital signal image by determining parameters of a closed curve arranged to lie adjacent a plurality of edge features of the digital signal image, said curve being constrained to exceed a minimum curvature and to have a minimum length compatible therewith.

7. A method as in claim 6 in which the curve is initially generated proximate the plurality of edge features of the digital signal image, and subsequently interactively re-generated to reduce its distance from said edge features.

8. A method according to claim 6 in which the located portion of the digital signal image is a face or a head of a person.

9. A method of verifying the identity of the user of a data carrier, said method comprising the steps of:
   generating a digital signal facial image of the user;
   receiving the data carrier and reading therefrom identification data signals;
   performing on the digital signal facial image the steps of:
   (i) locating within the digital signal image the position of at least one predetermined feature;
   (ii) extracting digital signal image data from said image representing each said feature;
   (iii) generating for each feature a feature vector signal representing the position of the image data of the feature in an N-dimensional space, N being an integer and said space being defined by a plurality of reference vectors signals each of which is an eigenvector of a training set of images of like features; and
   (iv) modifying the digital signal image data of each feature to normalize the shape of each feature thereby to reduce its deviation from a predetermined standard shape of said feature, which step is carried out before generating the feature vector for each feature;
   comparing data signals representing each feature vector with the identification data signals; and
   generating a verification signal in dependence upon the comparison.

10. Apparatus for verifying the identity of the user of a data carrier comprising:
    means for generating a digital signal facial image of the user;
    means for receiving the data carrier and reading therefrom identification data signals;
    means for performing on the digital signal facial image the steps of:

(i) locating within the digital signal image and position of at least one predetermined feature;

(ii) extracting digital signal image data from said image representing each said feature;

(iii) generating for each feature a feature vector signal representing the position of the image data of the feature in an N-dimensional space, N being an integer and said space being defined by a plurality of reference vector signals each of which is an eigenvector of a training set of images of like features; and (iv) modifying the digital signal image data of each feature to normalize the shape of each feature thereby to reduce its deviation from a predetermined standard shape of said feature, which step is carried out before calculating the feature vector for each feature; and means for comparing data signals representing each feature vector with the identification data signals and generating a verification signal in dependence upon the comparison.

11. Apparatus as in claim 10 in which the means for generating a digital signal facial image of the user comprises a video camera, the output of which is connected to an AD convertor.

* * * * *